April 23, 1957 W. G. MAY 2,789,868
APPARATUS FOR FLOWING COARSE SOLIDS
Filed April 29, 1953

Walter G. May  Inventor

By /s/ Lewis M. Thomas Attorney 2,789,868
Patented Apr. 23, 1957

2,789,868

APPARATUS FOR FLOWING COARSE SOLIDS

Walter G. May, Union, N. J., assignor to Esso Research and Engineering Company, a corporation of Delaware Application April 29, 1953, Serial No. 351,845

3 Claims. (Cl. 302—51)

The present invention relates to a process and apparatus for the control of the flow of coarse solids from a standpipe to a riser, in which the coarse solids are to be carried as a dispersed phase.

Systems for feeding fluidized solids, and particularly solid particles of relatively small size, i. e. below about 200 microns average diameter, are well known and widely used in the petroleum and chemical industries. In some cases, however, it is desired to use coarser particles, for example, as heat transfer media as well as reactant materials. The use of the fluidized solids technique for flow of coarse particles has not been as satisfactory as for fine particles. The present invention relates to improvements, in handling the flow of coarse particles from a vertical or vertically extending column or standpipe where they are in relatively dense phase to a riser where they are carried in relatively dispersed phase by reason of a high velocity gas or gasiform stream.

It has been found that when it is attempted to feed coarse solid particles from a standpipe into a high velocity riser it is difficult to obtain smooth and efficient operation. Flow is apt to be erratic and irregular. An object of the present invention is to improve smoothness of operation and this is accomplished in the manner described below.

Figure 1:
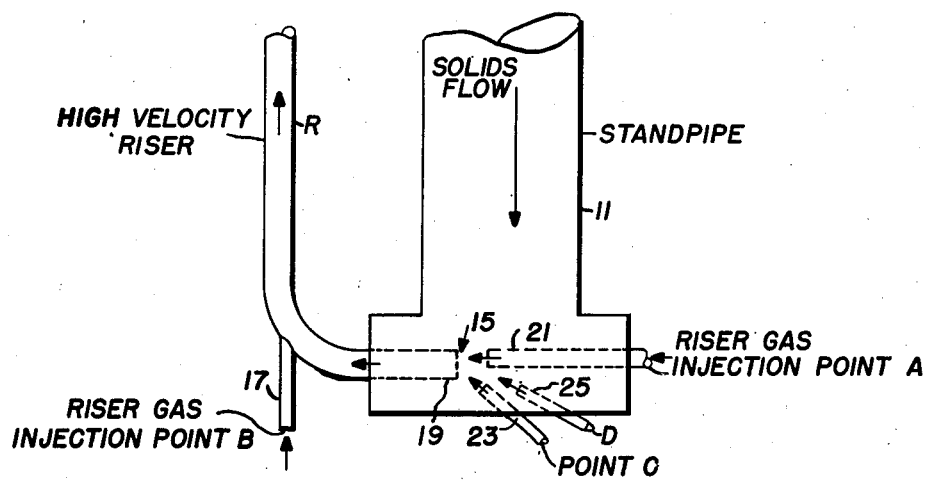

Referring to the drawings, Fig. 1 shows fragmentarily a standpipe and riser system in which a stream of relatively coarse solid particles is to be fed from the standpipe to the riser.

Figure 2:
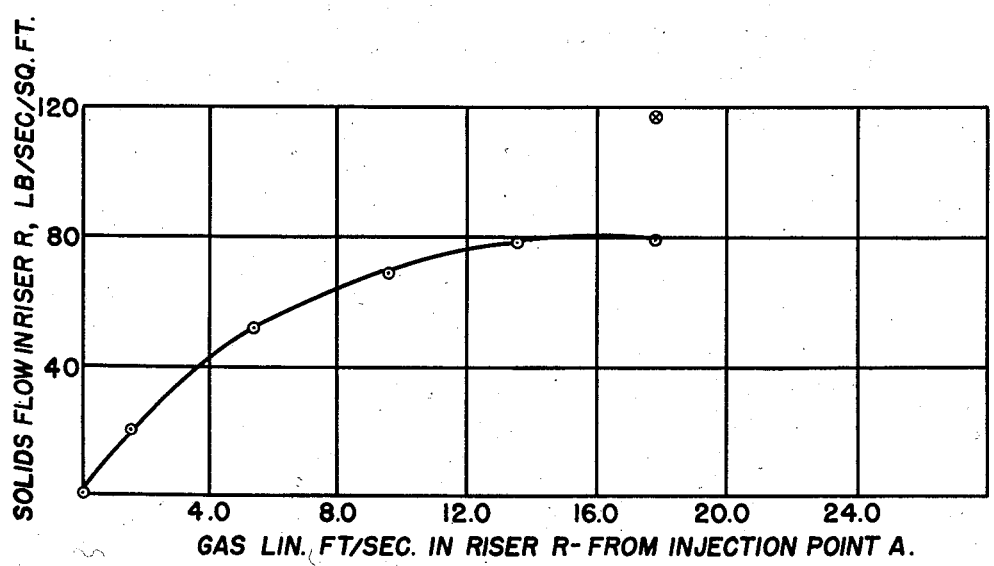

Fig. 2 shows graphically the relation between the rate of flow of the solids and the gas flow from specific injection points described below.

Referring first to Fig. 1 there is shown the lower part of a vertically or upwardly extending column or standpipe 11 which is of relatively large diameter and to which coarse particles of solid material are fed from a point above. These solids flow down the standpipe under force of gravity although they are partially buoyed up by a fluidizing or partially fluidizing gas stream introduced, for example, at point D through a suitable inlet line. Some of the gases introduced at points A and C may also assist somewhat in this buoying up of the particles as will be explained.

A high velocity riser R consists of a conduit which connects from a point near the bottom of standpipe and leads to an elevated point in the system which need not be described. For example, the standpipe or column might lead from a reactor and the riser to a regenerator. Alternatively, the standpipe or column might lead from a source of solid particles and the riser to a reactor or the like. In some cases the riser R may itself be a reactor such as a transfer line burner, contactor or the like.

Assuming that the standpipe has a fluostatic or pseudofluostatic head of solids therein, these solids would tend to pack in the bottom of the standpipe and around the entrance to the riser as indicated by the arrow 15. There would be no flow or no substantial flow of the solids into the riser, however. It will be noted that the end of riser R projects into and partly across column 11 for a reason explained below. Now assuming that a jet of air or other lifting or aerating gas (the term "gas" as herein used includes vapors) is introduced into the riser through an inlet 17 at injection point B, a slight vacuum might be created at the entrance 19 of the riser so as to draw some solids into the riser. This is more likely to be true with small particles of low density. When the solid particles are coarse, however, and are not fluidized in standpipe or column 11, as is the case in the system described herein, there is little tendency to flow because any aerating gas within the standpipe, for example around the entrance point 19, will simply tend to flow around individual particles and into the riser or up column 11. Hence, the feed of solids into the riser will be low or substantially nil, even with a substantial stream of gas flowing into injection point B and the inlet 17. This is in contrast to the case when the standpipe contains truly fluidized solids, especially finer solid particles of the usual size range (200 microns average diameter and less). Such fluidized materials behave much like a liquid, and will flow from standpipe to the riser or vice versa to "seek its own level."

However, if a nozzle 21 is directed toward or substantially toward the inlet 19 of riser R and gas is injected through this nozzle from a point such as A, the flow of solids into the riser increases very substantially as the velocity of the gas from point A is increased. The spacing between nozzle 21 and inlet 19 is preferably less than about 3 riser diameters. Operation is very satisfactory if point A is somewhat higher than inlet 19, the nozzle sloping downwardly somewhat. The downward component of gas flow cooperates with the gravitation of the solids.

Referring to Fig. 2, actual operating data are shown. A system was established where the total gas velocity in the riser R was maintained substantially constant at about 30 feet per second. When all of this gas was injected from point B there was no measurable flow of solids. When 1.32 feet per second of the gas velocity in R was supplied by gas from injection point A and the remainder, 28.9 feet per second in riser R, came from point B, the flow of solids increased from substantially zero to 19.9 pounds per second per square foot of cross-section in the riser.

As the velocity due to gas from injection point A was increased and that from point B correspondingly decreased, to keep the total gas flow in the riser substantially constant, the flow of solids into the riser R increased very substantially. The curve showing solids flow flattened off substantially at about 80 pounds per second per square foot when the larger part of the fluidizing gas came from the nozzle 21 and from point A.

The amount of solids caused to flow by a given amount of gas injected through nozzle 21 will be influenced by the size of the gap between the entrance to the riser 19, and the end of the nozzle. If this gap is made too small gas will flow directly into the riser carrying no solids with it. If it is made too large, there is an excessive pressure drop between the nozzle and the riser inlet, and some of the gas will flow up the standpipe instead of into the riser. The preferred gap is in the range one-half to five riser diameters, preferably one to about three diameters, for apparatus of normal size.

Generally the larger the gap between nozzle and riser, the larger will be the weight of solids pushed into the riser by a given volume of gas; this will be done at the expense of a larger pressure drop, and as previously explained, too large a gap will cause a loss of effectiveness.

A further experiment illustrating the effect of injecting gas farther back from the riser inlet was conducted by introducing another nozzle 23 from another injection point C. This nozzle was directed toward the inlet 19 substantially as indicated in Fig. 1. This also was pointed substantially toward the inlet 19 of riser R. Inlet 19, it has been found, must extend into the downflowing column for smooth and efficient operation. As indicated by point X on Fig. 2 when the total gas velocity in riser R was 29.3 feet per second, 17.3 feet of this being supplied from point A, 7.97 from point B, and 4.0 from point C, the total solids flow was about 118 pounds per second per square foot. This is nearly 50% higher than the flow due to a single injecting nozzle 21. Nozzle C might be placed above or below point A, if desired. These data indicate that multiple injection of gas may be advantageous as a further refinement on the control of the solids flow. A still further injection nozzle 25 from another point D may be used if desired, and the various nozzles 21, 23, 25, may be spaced to different distances from the inlet 19. The data referred to above and indicated in Fig. 2 are tabulated as follows:

*Table*

| Gas Flow, ft/sec. in Riser: | | | | | | |
|---|---|---|---|---|---|---|
| Into A | 1.32 | 5.3 | 9.3 | 13.3 | 17.3 | 17.3 |
| Into B | 28.9 | 24.8 | 20.8 | 16.2 | 12.0 | 7.97 |
| Into C | | | | | | 4.0 |
| Total | 30.2 | 30.1 | 30.1 | 29.5 | 29.3 | 29.3 |
| Solids Flow—lbs./(sec. sq. ft.) | 19.9 | 52.6 | 68.1 | 78.5 | 79.8 | 118 |

It should be noted that the gas fed into the lower part of the column or standpipe also tends to flow up this column and to fluidize the solids therein. The total input of gas through points A, C, and D (where the latter are used) should never be quite enough to fluidize the downcoming solids in 11, otherwise erratic operation will result.

The location of the points A, C and D, etc., may be varied considerably, so long as the nozzles are directed toward inlet 19 and the proper spacings and gas flow rates are maintained.

What is claimed is:

1. Apparatus for transferring coarse solid particles from one part of a system to another which includes a standpipe for confining a downflowing stream of coarse solids in a non-fluidized dense condition, a conduit leading upwardly from the lower portion of said standpipe, the inlet end of said conduit extending horizontally into the lower portion of said standpipe and partially crossing said standpipe, a line for injecting a stream of lifting gas into the lower portion of said conduit outside said standpipe, nozzle means arranged substantially horizontally and partially crossing the lower portion of said standpipe for injecting gas and solid particles directly into said conduit inlet, the outlet of said nozzle means being spaced from said conduit inlet for a distance of about 1 to 3 conduit diameters.

2. An apparatus according to claim 1 wherein multiple nozzles are provided at the bottom portion of said standpipe for injecting gas into said conduit inlet and for changing the rate of flow of solids through said conduit.

3. An apparatus according to claim 1 wherein an additional nozzle extends upwardly at an angle toward the inlet of said conduit and has its outlet end spaced from the inlet end of said conduit.

References Cited in the file of this patent

UNITED STATES PATENTS

| 749,206 | Limbert | Jan. 12, 1904 |
| 1,914,991 | Coghlan | June 20, 1933 |
| 2,191,096 | McCurdy | Feb. 20, 1940 |
| 2,561,409 | Ardern | July 24, 1951 |
| 2,623,793 | Hill | Dec. 30, 1952 |
| 2,687,919 | Bullington | Aug. 31, 1954 |

FOREIGN PATENTS

| 331,322 | Great Britain | July 3, 1930 |